(12) United States Patent
Ferguson

(10) Patent No.: US 12,203,616 B1
(45) Date of Patent: Jan. 21, 2025

(54) FIRST RESPONDER LIGHTING DEVICE

(71) Applicant: Shawn Patrick Ferguson, New York, NY (US)

(72) Inventor: Shawn Patrick Ferguson, New York, NY (US)

( * ) Notice: Subject to any disclaimer, the term of this patent is extended or adjusted under 35 U.S.C. 154(b) by 0 days.

(21) Appl. No.: 18/646,340

(22) Filed: Apr. 25, 2024

(51) Int. Cl.
| | | |
|---|---|---|
| *F21S 41/141* | (2018.01) | |
| *F21S 9/03* | (2006.01) | |
| *F21V 21/06* | (2006.01) | |
| *F21V 23/04* | (2006.01) | |
| *B60Q 7/00* | (2006.01) | |
| *F21W 131/40* | (2006.01) | |

(52) U.S. Cl.
CPC ............ *F21S 41/141* (2018.01); *F21S 9/03* (2013.01); *F21V 21/06* (2013.01); *F21V 23/0485* (2013.01); *B60Q 7/00* (2013.01); *F21W 2131/40* (2013.01)

(58) Field of Classification Search
CPC ........... F21S 9/03; F21S 21/06; F21S 23/0485
See application file for complete search history.

(56) References Cited

U.S. PATENT DOCUMENTS

| | | | |
|---|---|---|---|
| 6,293,684 B1 | 9/2001 | Riblett | |
| 8,072,345 B2 * | 12/2011 | Gallo | ...................... F21S 43/19 |
| | | | 340/815.45 |
| 9,163,792 B2 | 10/2015 | Weidman et al. | |
| 9,737,777 B2 | 8/2017 | April et al. | |
| 11,554,715 B2 | 1/2023 | Yudelevich et al. | |
| 2003/0070603 A1 | 4/2003 | VanderMolen et al. | |
| 2010/0194556 A1* | 8/2010 | LaRosa | ................ B60Q 1/2615 |
| | | | 340/471 |
| 2017/0082280 A1 | 3/2017 | Reiser | |
| 2022/0176875 A1 | 6/2022 | Gucwa | |

FOREIGN PATENT DOCUMENTS

| | | |
|---|---|---|
| CN | 204759743 U | 11/2015 |
| CN | 218446977 U | 2/2023 |
| CN | 219320900 U | 7/2023 |

* cited by examiner

*Primary Examiner* — Anne M Hines

(74) *Attorney, Agent, or Firm* — Venable LLP

(57) ABSTRACT

A vehicle attachment comprising a housing body comprising a pivot. The vehicle attachment can also have a detachable component comprising an elongated body having a multiplicity of sides, wherein a head portion is located on a distal end of the elongated body and a handle is located at the proximal end of the elongated body. The attachment can additionally have a coupling assembly configured to allow the detachable component to be removed and a charging assembly, wherein said charging assembly comprising a battery and an output, wherein the charging assembly is configured to charge the detachable component.

17 Claims, 8 Drawing Sheets

FIG. 9A
FIG. 9B
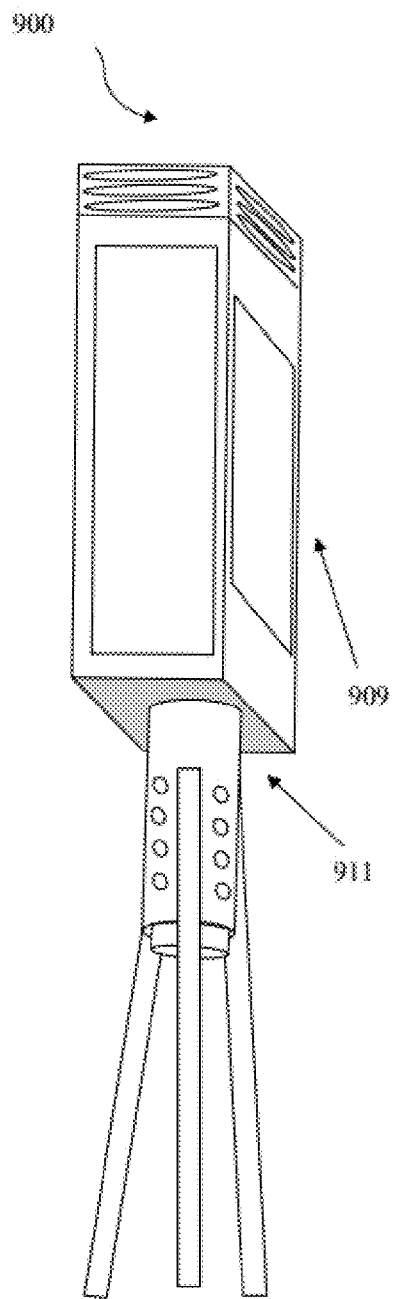
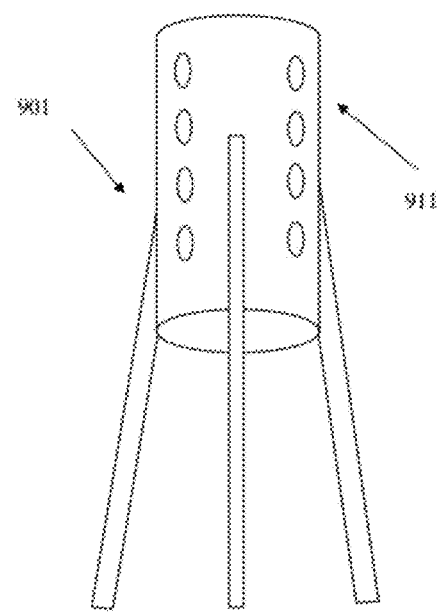

FIRST RESPONDER LIGHTING DEVICE

FIELD OF THE INVENTION

The present disclosure relates to a vehicle attachment including lighting devices designed specifically for first responders, such as law enforcement officers, firefighters, paramedics, and other emergency personnel. More specifically, the present disclosure pertains to a vehicle attachment including an advanced lighting system that enhances the safety, visibility, and operational efficiency of first responders during emergency situations and low-light conditions.

BACKGROUND

First responders play a critical role in safeguarding public safety and responding to emergencies ranging from accidents and natural disasters to criminal activities. Timely and effective responses are essential in these situations, and visibility is often a key factor in ensuring the success of rescue and emergency operations. Conventional lighting tools, such as flashlights and emergency beacons, have limitations in terms of brightness, durability, and adaptability to diverse operational scenarios.

The need for improved lighting solutions for first responders has become increasingly evident as the complexity and demands of emergency situations continue to grow. Existing lighting devices often fall short in meeting the specific requirements of first responders, hindering their ability to navigate challenging environments, communicate effectively, and coordinate rescue efforts.

SUMMARY

An object of the present disclosure is to provide a vehicle attachment including a lighting device for first responders during traffic stops, accidents, or emergency road stops.

The present disclosure relates to a vehicle attachment comprising: a housing body comprising a pivot; a detachable component comprising an elongated body having a multiplicity of sides, wherein a head portion is located on a distal end of the elongated body and a handle is located at the proximal end of the elongated body; a coupling assembly configured to allow the detachable component to be removed; and a charging assembly, wherein said charging assembly comprising a battery and an output, wherein the charging assembly is configured to charge the detachable component.

The present disclosure addresses the shortcomings of traditional lighting tools by providing a cutting-edge lighting system tailored to the unique needs of first responders. The system integrates advanced technologies to offer superior brightness, durability, versatility, and adaptability to a wide range of operational scenarios.

An embodiment of the present disclosure may incorporate state-of-the-art LED technology to deliver exceptionally bright and focused illumination, enhancing visibility in low-light environments.

BRIEF DESCRIPTION OF THE DRAWINGS

FIGS. 9A-9B are illustrations of a vehicle attachment standing upright according to an embodiment of the present disclosure.

DETAILED DESCRIPTION

Figure 1:
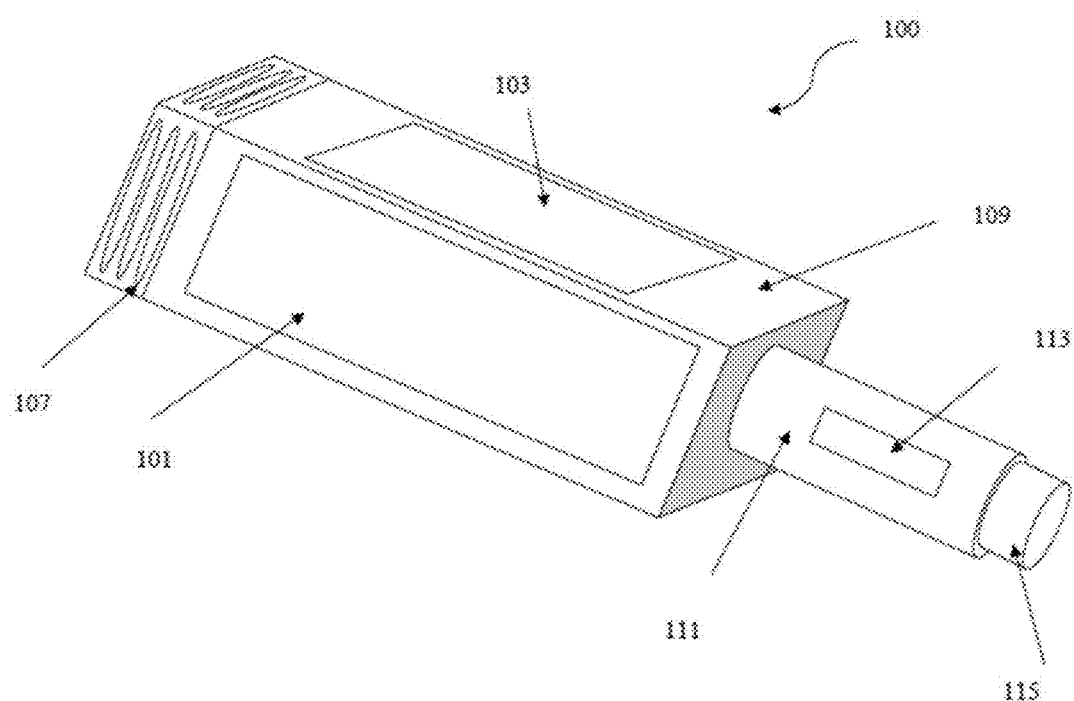
FIG. 1 is an illustration showing a detachable component according to an embodiment of the present disclosure.

The present disclosure relates to a vehicle attachment comprising: a housing body comprising a pivot; a detachable component comprising an elongated body having a multiplicity of sides, wherein a head portion is located on a distal end of the elongated body and a handle is located at the proximal end of the elongated body; a coupling assembly configured to allow the detachable component to be removed; and a charging assembly, wherein said charging assembly comprising a battery and an output, wherein the charging assembly is configured to charge the detachable component.

In some embodiments, the vehicle attachment further comprises a solar panel on the housing body.

In some embodiments, the elongated body comprises an LED assembly coupled to each side of the elongated body, the LED assembly including one or more LED screens.

In some embodiments, the elongated body comprises at least one communication sensor configured to detect audio information, visual information, and/or location information.

In some embodiments, the head portion comprises a flashlight having a hardened lens, wherein the hardened lens is capable of withstanding a blunt force.

In some embodiments, the handle comprises a pressure pad configured to detect an identity of a user and/or detect a specific movement sequence when operating the vehicle attachment.

In some embodiments, the housing body further comprises an interior circuitry configured to obtain signals in communication with an external source.

In some embodiments, the handle comprises a set of retractable legs capable of serving as a tripod stand.

In some embodiments, the elongated body further comprises at least one screen contained within the elongated body that is configured to extend from the elongated body.

In some embodiments, the vehicle attachment of claim 1, wherein the handle comprises a pommel.

The present disclosure also relates to a vehicle comprising the vehicle attachment.

The present disclosure also relates to a method of operating the vehicle attachment. The method includes the steps of powering on the detachable component and displaying a message on at least one of the multiplicity of sides.

In some embodiments, the method further comprises the step of detaching the detachable component from the housing body.

In some embodiments, the method further comprises the step of extending a set of retractable legs from the detachable component; and positioning the detachable component to an upright position using the set of retractable legs.

In some embodiments, the method further comprises the step of applying pressure to a pressure pad on the handle; and activating a predetermined activation sequence.

In some embodiments, the method further comprises the step of extending at least one screen contained within the elongated body to an extended outright position.

Hereinafter, exemplary embodiments of the present disclosure will be described in more detail with reference to the drawings. However, the following drawings attached to the present specification show preferred exemplary embodiments of the present disclosure, and serve to further understand the technical spirit of the present disclosure together with the aforementioned content of the present disclosure, and therefore, the present disclosure should not be interpreted as being limited only to the matters described in these drawings.

The terms used in the present disclosure are to describe the exemplary embodiments, and are not intended to limit the present disclosure. In the present disclosure, the singular also includes the plural unless specifically stated otherwise in the phrase.

"Comprises" and/or "comprising" used in the present disclosure are used as the meaning that does not preclude the presence or addition of one or more other components, steps, operations, and/or elements other than the mentioned components, steps, operations, and/or elements. The same components are denoted by the same reference numerals throughout the specification.

"Below", "bottom", "under", "above", "top", and "over" that are spatially relative terms may be used to easily describe the correlation between one element or components and another element or components as shown in the drawings. Spatially relative terms should be understood as terms including different directions of the element during use or operation in addition to the directions shown in the drawings. For example, when the elements shown in the drawings are turned over, the element described as "below" or "under" another element may be placed "above" another element. Therefore, the exemplary term "below" may include both downward and upward. The element may also be oriented in other directions, and therefore, the spatially relative terms may be interpreted depending upon the orientation.

Referring to FIG. 1, a detachable component 100 according to an embodiment may include: an elongated body 109, a flashlight 107 arranged on a distal end of the elongated body, at least one LED screen 101, 103 arranged on the sides of the elongated body 109, a handle 111 located on a proximal end of the elongated body, and a pommel 115.

The elongated body 109 may include at least one LED screen 101, 103 arranged on at least one side of the detachable component 100. The screens 101, 103 can be programmed to display distinct messages and/or colors that may alert passersby of a situation in progress. Non-limiting example messages may include: 'Move left' or 'Officer in Road' or 'Accident-10 min Delay' or 'Slow' or the like. Advantageously, first responder vehicles having the detachable component 100 displaying messages to oncoming vehicles offer significant benefits in enhancing road safety and communication during emergency situations. These messages serve as crucial alerts to inform drivers about the presence of an emergency vehicle and the nature of the situation ahead. This proactive communication helps reduce response times by prompting other motorists to clear the way promptly, allowing first responders to reach their destination more efficiently. Additionally, it contributes to overall traffic management by preventing congestion and ensuring a smoother flow of traffic around emergency scenes. The increased visibility and awareness facilitated by these messages ultimately enhance the safety of both emergency responders and the public on the road.

The detachable component 100 may also include various audio, visual, and location related sensors (not shown). These sensors can include at least cameras, microphones, speakers, and GPS communication. A goal of the device is to record everything that takes place around an incident while the detachable component 100 is either on standby or in use. The benefit of recording information for first responders is paramount in optimizing emergency response efforts. Through meticulous documentation, first responders can create a detailed record of the incident, encompassing critical details such as timelines, actions taken, and the evolving nature of the emergency. This recorded information serves as a valuable resource for subsequent investigations, legal proceedings, and accountability assessments. Moreover, it aids in the enhancement of training programs by allowing a comprehensive analysis of response strategies, enabling continuous improvement and the refinement of protocols.

The elongated body 109 may also include an interior circuitry (not shown) that can be connected to an outside server or phone application. By way of example, a user could use a phone application to activate the detachable component 100 or choose which message to display on the screen 101, 103 of the elongated body 109. This feature allows the detachable component 100 to interface with external devices, servers, or applications. By connecting to an outside phone, server, or dedicated application, the detachable component 100 becomes a smart and adaptable tool. This connectivity can enable users to remotely control the detachable component 100, customize lighting patterns, or receive real-time updates on its status. Whether it's adjusting brightness levels, changing colors, or receiving emergency alerts, this integration enhances the device's functionality and responsiveness.

The capability of recording data either in the detachable component 100 or the housing body facilitates better resource allocation, ensuring that the right personnel and equipment deployed can effectively address the specific needs of an emergency situation. Additionally, it can foster improved communication and coordination among various response teams, fostering a synchronized approach. The act of recording information can empower first responders with the insights needed for informed decision-making, situational awareness, and the ongoing enhancement of emergency management practices. The elongated body 109 can also be wrapped in framing such as shock absorbing mounts and reinforced enclosures that give the detachable component 100 a strong defense that allows for damage prevention or self-defense of a wielder.

The flashlight 107 may be arranged to connect to the distal portion of the elongated body 109. The flashlight 107 can be designed to have a hardened lens (not shown) to be used for scratch resistance, chemical resistance, weather protection, and longevity. Emergency situations often require tools that are meant to deal with dangerous and adaptive responses.

As displayed, the handle 111 may be arranged with a pommel 115 for defense if needed. Also, via the pommel 115, the handle may be locked into dirt, sand, snow, snowbanks, in-between tree branches, sheet rock, and used for breaking glass/hacking at various obstacles. The handle 111 can also be arranged with a pressure pad 113 that a user can press in a predetermined sequence to activate the detachable component 100. For example, a user may apply pressure to the pressure pad 113 twice to turn the device on. The application of pressure to the pressure pad 113 may not be limited to turning on/off the device. Instead, any pre-programmed command can be executed by squeezing, moving, waving, etc. the handle 111. The handle 111 may include motion sensors (not shown) that detect the movement of the handle 111 in any direction. The movement detection can be integrated into the program activation sequence of the detachable component 100. In another example of activating a program is as follows: a soft pressure application of the pressure pad 113, followed by a harder pressure application, further followed by one quick shake of the handle 111 while holding the pressure pad 113 may activate an alert function that transmits a distress signal to local authorities. One benefit of this activation method is allowing an 'operating officer' or 'tarmac crew' to detach the device while using a private sequence. The handle 111 can also be configured to have a fingerprint aspect that can detect an identity of a user.

In another embodiment, the handle 111 can be fitted with a touchscreen (not shown) that may provide a different mode of activating the device. The touchscreen may be programmed to wide display a range of messages that indicate a status of the device. For example, the touchscreen can display a "STANDBY" message or simply show a red color that indicates that the device is in a rest mode. A user may press the touchscreen to activate the device after being prompted. The flashlight 107 and at least one LED screen 101, 103 may also be controlled via the touchscreen on the handle 111. The touchscreen can also be placed at the intersection of the handle 111 and the elongated body 109. This placement allows a user to still press the touchscreen while holding onto the pressure plate 113 of the detachable component 100.

Figure 2:
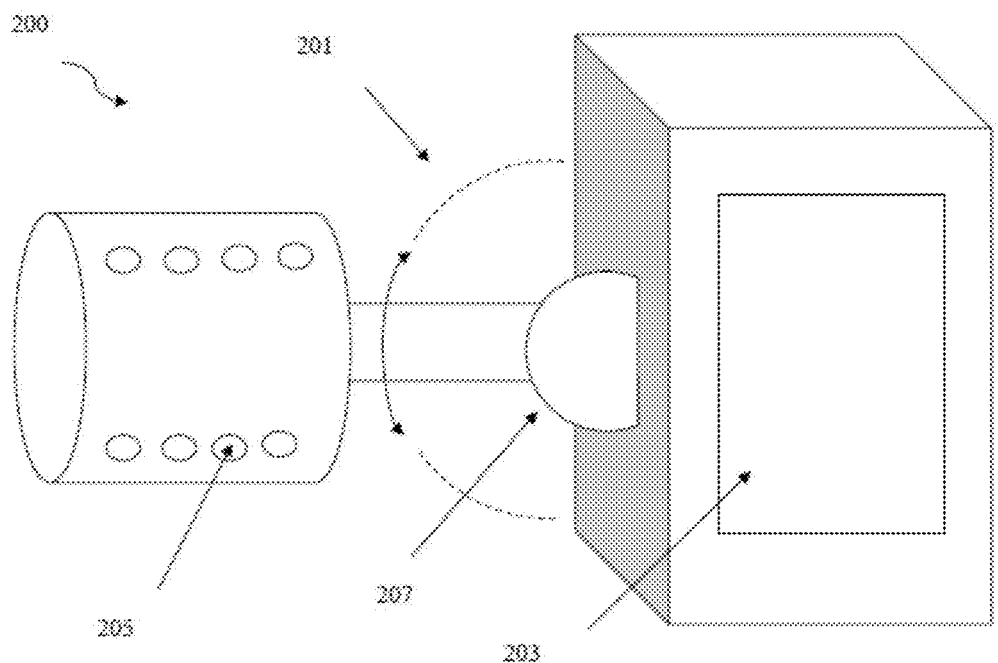
FIG. 2 is an illustration of a housing body according to an embodiment of the present disclosure.

Referring to FIG. 2 shows a housing body 200 according to the exemplary embodiment of the present disclosure. The housing base 203 can be integrated into the design of a vehicle (not shown) during manufacturing or can be added to the vehicle post manufacturing. The housing body 200 may include a housing base 203, a holster 205, and a pivot 207. The detachable component 100 of the vehicle attachment is arranged to connect to the housing body 200 via the handle 111 of the detachable component 100 and the holster 205 as shown for example in FIGS. 3A & 3B. The pivot 207 allows the detachable component 100 to swivel about an axis. Another embodiment of the connection allows the detachable component to swivel freely in any direction as compared to the housing base 203. By disconnecting and reconnecting an embodiment of the detachable component 100 of FIG. 1, to an embodiment of the housing body 200, the detachable component 100 can be used by vehicles and users alike transitioning from a stationary to a handheld mode with ease.

The handheld nature of the detachable component 100 can allow for a varied use in all emergency situations. The versatility of the detachable component 100 takes a turn as it becomes detachable from a vehicle, featuring a handheld mode designed for various emergency situations. In this portable configuration, the detachable component 100 can serve as a multi-functional tool, offering utility beyond illumination. Users can wield it for self-defense purposes, utilizing its sturdy build and potentially blinding light via a strobe function to deter potential threats. Additionally, the handheld mode can prove invaluable for tracking or signaling in emergency situations, helping individuals stay visible and connected. In critical moments, the detachable component 100 can also be a life-saving tool, featuring capabilities like window-breaking in case of entrapment or directing pedestrians with its powerful light.

Figure 3A:
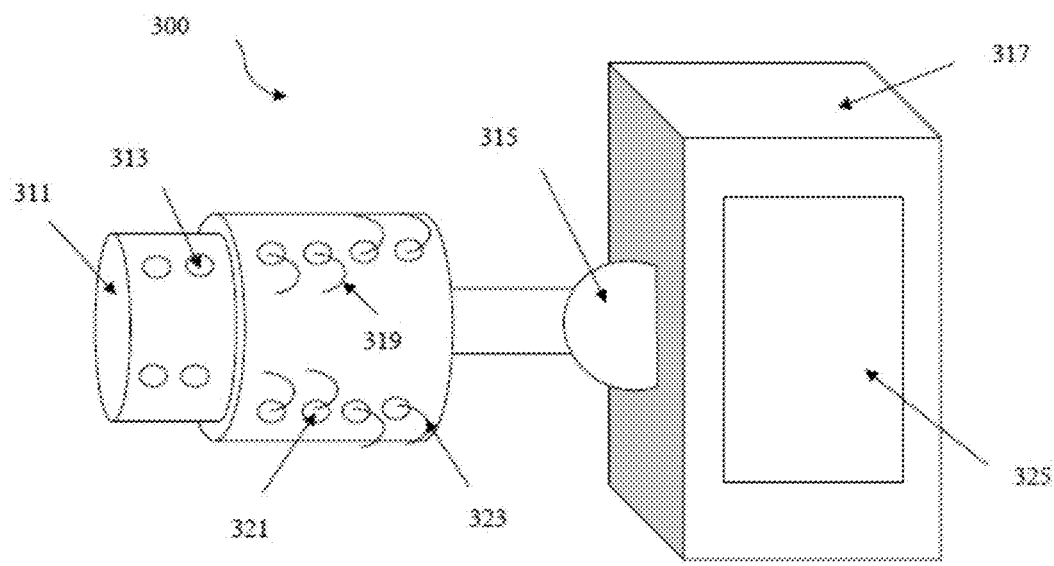
FIGS. 3A-3B are illustrations showing a connection between a detachable component and a housing body according to an embodiment of the present disclosure.
Figure 3B:
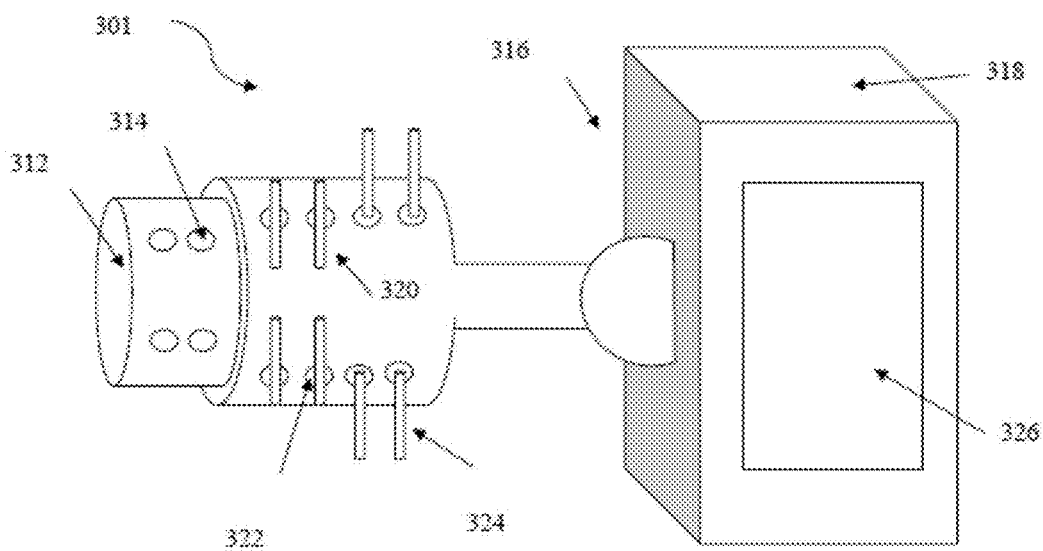

Referring to FIGS. 3A-3B show a connection between a detachable component 100 and a housing body 200 according to an embodiment of the present disclosure. The coupling assemblies 300, 301 are non-limiting examples of how the detachable component 100 may connect to the housing body 200. There are numerous other connections known in the art that may serve the same purpose of giving the detachable component 100 free motion during use of the vehicle attachment.

As shown in FIG. 3A, coupling assembly 300 may include one or more hooks 319 and openings 313 to couple the handle 311 of the detachable component 100 to the housing body 200. In this embodiment, the hooks 319 pass through openings 313 of the handle 311 of the detachable component 100 thereby locking the handle 311 into a set place. This connection is designed to give a vehicle or user a sense of security when moving the detachable component 100 around the pivot 315. Hooks 319 can either be in a locked position 321 or the unlocked position 323 depending on a user's preference.

As shown in FIG. 3B, coupling assembly 301 may include one or more motorized pins 320 instead of hooks 319 to lock the detachable component 100 into place. In this embodiment, the pins 320 pass through openings 314 of the handle 312 of the detachable component 100 thereby locking the handle 312 into a set place. This connection is designed to give a vehicle or user a sense of security when moving the detachable component 100 around the pivot 316. Pins 320 can either be in a locked position 322 or the unlocked position 324 depending on a user's preference.

The importance of using motorized pins 320 or hooks 319 to lock a mechanical aspect into place is underscored by the precision, adaptability, and safety benefits they offer. They provide a reliable and automated method for securing mechanical components, ensuring accurate alignment and a secure connection. This is particularly valuable in scenarios where precise positioning is critical via the pivots 315, 316. The automated nature of motorized pins 320 or hooks 319 allows for quick and efficient locking, reducing the reliance on manual labor and minimizing the chances of human error. Additionally, motorized pins 320 or hooks 319 can be programmed for specific tasks and adjusted to accommodate varying mechanical configurations, enhancing their versatility in different settings. The use of such technology contributes to increased operational efficiency, as it enables rapid and repeatable locking procedures. Furthermore, the controlled and automated nature of motorized pins 320 or hooks 319 enhances safety by reducing the risk of accidents associated with manual locking mechanisms.

The main bodies 317, 318 of the housing body 200 may be designed to include at least one touchscreen 325, 326. The touchscreen 325, 326 may provide a user ease when locking and unlocking the detachable component 100 from the housing body 200. The user interface of the touchscreen 325, 326 may provide simple messages such as "UNLOCK" or "LOCK", or the messages may be more complex depending on the vehicle manufacturer's or a user's preference. If a user wants to detach the detachable component 100 from the housing body 200 including the main body 317, 318, then the user can simply press or hold the touchscreen 325, 326 for a certain amount of time which will either release or attach the detachable component 100.

Not only can the main body 317, 318 of the housing body 200 serve as an unlocking/locking mechanism, but it can also as serve as a power source for the detachable component 100. The elongated body 109 of the detachable component 100 can be configured to include a battery (not shown) that is both rechargeable and can stand on its own. When the detachable component 100 is connected to the housing body 200, the battery can be charged either from the housing body 200 directly, from a vehicle's power source through the housing body 200 to the detachable component 100, or a combination of the two. Once the detachable component 100 is detached from the housing body 200, a battery of the detachable component 100 can either run on a charge that was provided by the housing body 200/vehicle or a new battery that was replaced within the detachable component 100. This charging versatility allows the detachable component 100 to be used in more diverse situations where certain charging methods may not be available.

The housing body 200 can also be configured to hold valuable information including a language database where a multitude of languages are stored. This information can then be passed onto the detachable component 100 so that the detachable component 100 could be used as an instant interpreter or be used as an international megaphone able to relay messages in all languages. The housing body 200 can store similar databases depending on a user's preference as emergency situations often require a broad range of tools. Other databases can also be programmed directly into the detachable component 100 in separate embodiments.

Figure 4:
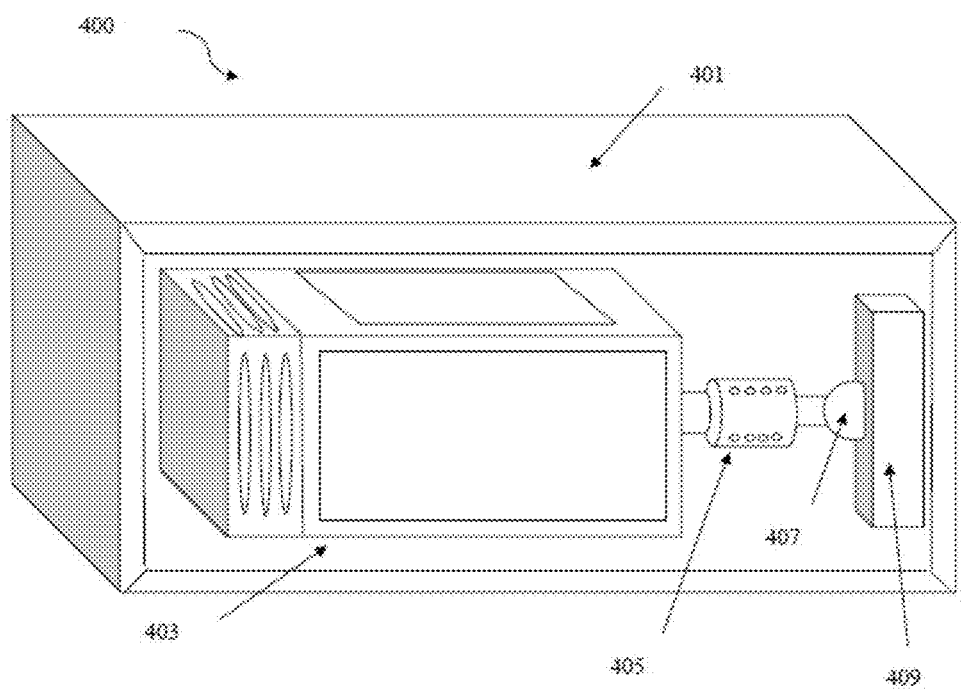
FIG. 4 is an illustration showing a detachable component of a vehicle attachment within an enclosure body according to an embodiment of the present disclosure.

Referring to FIG. 4 shows the detachable component 403 of the vehicle attachment within a separate housing body 401 according to the exemplary embodiment of the present disclosure. As shown in FIG. 4, the enclosure 400 comprises a housing body 401 can act as an enclosure to the detachable component 403 and the housing base 409. The housing body 401 on the side of a vehicle, equipped with a lighting device, can play a pivotal role in ensuring both safety and protection. By enclosing the detachable component 403 within a dedicated housing body 401, it can shield the device from external elements, such as rain, dust, and debris. This protective feature not only extends the lifespan of the lighting equipment but also ensures its reliable functionality in various weather conditions. Moreover, the housing body 401 provides a safeguard against potential damage, preserving the integrity of the lighting system. This emphasis on protection is essential for maintaining the effectiveness of the detachable component 403, contributing significantly to the overall safety and durability of the vehicle, especially when navigating challenging environments or adverse weather conditions.

In another embodiment, enclosure 401 has a power aspect (not shown) that can charge the detachable component 403. This power aspect can either be independently added to the housing enclosure 401 or connected to a vehicle's battery. The enclosure 401 can also have a solar panel (not shown) on top of the enclosure 401 that can be integrated to the power aspect. This addition of a solar panel can allow the detachable component 403 to charge while not being used. The integration of a power aspect within the housing body 401 of a vehicle, specifically designed to charge the detachable component 403 ensures a constant and reliable power source for the lighting system and also contributes to enhanced sustainability. The ability to charge the detachable component 403 directly from the vehicle's power supply eliminates the need for external batteries or frequent replacements, promoting a more eco-friendly and cost-effective solution. Moreover, this integrated power aspect guarantees that the lighting device is always ready for use, providing continuous illumination during low-light conditions. Whether it's for emergency situations, extended journeys, or unexpected extended trips, the charging capability within the housing body 403 adds a layer of convenience, emphasizing the importance of a seamlessly powered lighting system for the overall functionality and safety of the vehicle.

The pivot 407 allows for ease of movement of the detachable component 403 while in an extended position. The inclusion of a pivot 407 in the housing body 401 of a vehicle, facilitating the extension of the detachable component 403, introduces an adaptable feature. This pivot 407 allows the detachable component 403 to be maneuvered into an extended position, offering a broader range of illumination. This proves particularly valuable in situations where specific areas need focused light, such as roadside repairs or outdoor activities. The adjustable position enhances the practicality and functionality of the lighting system, ensuring that it can be tailored to meet varying needs. The detachable component 403 is connected to the housing base 409 of the housing body 401 via the coupling assembly 405. Whether illuminating a larger workspace during nighttime tasks or providing directional light for specific purposes, the housing body's 401 pivot feature enhances the overall flexibility and utility of the detachable component 403.

Figure 5:
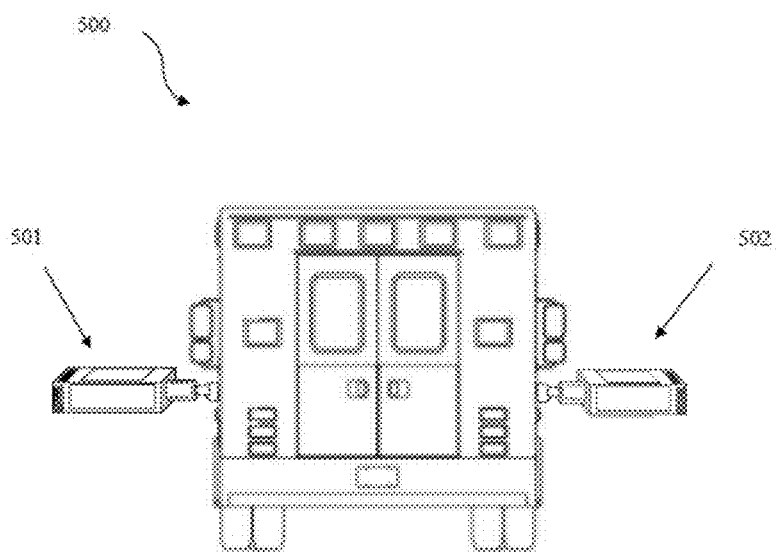
FIG. 5 is an illustration of a vehicle attachment in use on an emergency vehicle according to an embodiment of the present disclosure.

Referring to FIG. 5 shows the vehicle attachment in use on an emergency vehicle 500. The emergency vehicle 500 in the figure has two detachable components 501, 502 built into the vehicle. In separate embodiments, the detachable components 501, 502 can be attached to the sides of the emergency vehicle 500 after the manufacturing of the device. The detachable components 501, 502 along with respective housing can be held within the emergency vehicle 500 and pulled out during an emergency situation. In the figure, the detachable components 501, 502 are placed in extended positions to notify oncoming vehicles and passersby in all directions. The ability to pivot and extend the detachable components 501, 502 allows for a wide degree of visibility, ensuring that other vehicles and passersby are promptly and unmistakably notified of the emergency presence. The extended lighting positions not only create a highly visible beacon but also serve as directional indicators, guiding traffic and pedestrians away from potential hazards.

Figure 6:
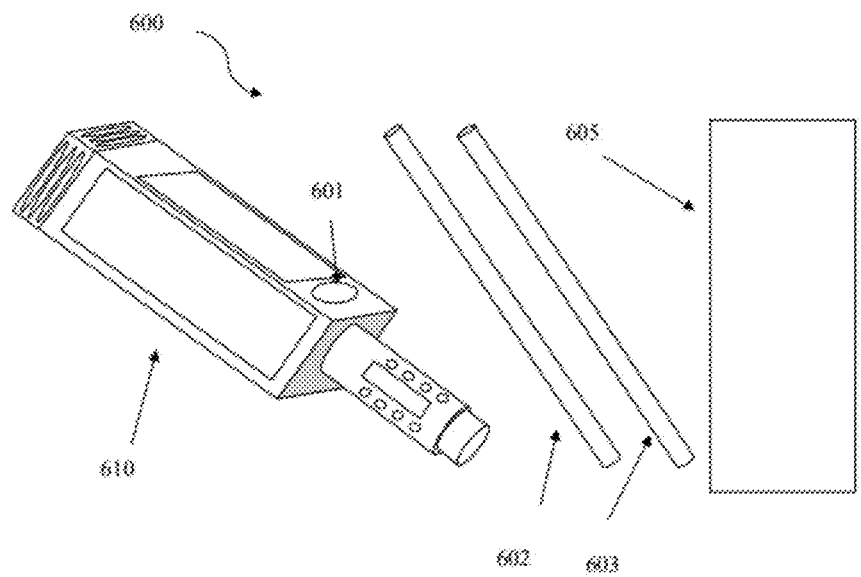
FIG. 6 is an illustration of a vehicle attachment used in conjunction with an LED banner according to an embodiment of the present disclosure.
Figure 7:
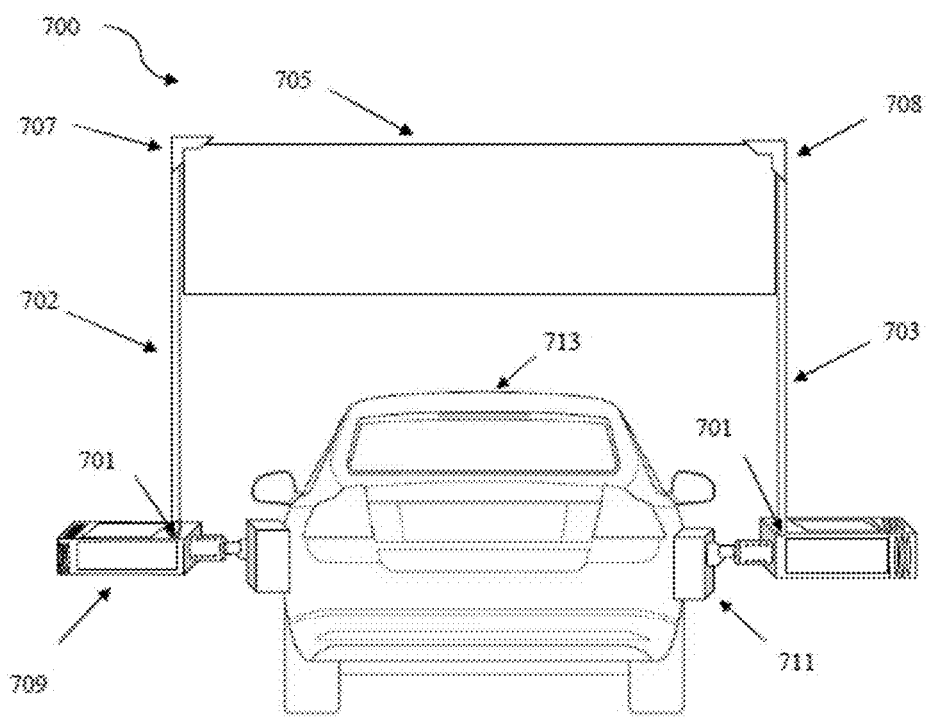
FIG. 7 is an illustration of a vehicle attachment used in conjunction with an LED banner according to an embodiment of the present disclosure.

Referring to FIGS. 6 & 7 show the vehicle attachment used in conjunction with a LED banner according to an exemplary embodiment of the present disclosure.

FIG. 6 includes a banner assembly 600 that lays out the materials needed for a banner setup 700. The LED banner 705 is designed to display larger messages than provided by the smaller detachable component 610. The LED banner setup can include a pole socket 601 within the detachable component 610, at least one supporting pole 602, 603, and a LED screen 605 that is designed to connect to at least one supporting pole 602, 603. The pole socket 601 can either be integrated into the detachable component 610 or the housing body 200 of the vehicle attachment. The detachable component 610 along with the at least one supporting pole 602, 603, and the LED screen 605 can be held within the back of emergency vehicles waiting to be brought out and used by first responders.

FIG. 7 is an example embodiment of the LED banner 705 in use during an emergency. The banner setup 700 includes at least one detachable component 709, supporting poles 702, 703, LED banner 705, fasteners 707, 708, and a housing body 711. The vehicle 713 can be a first responder vehicle such as a police car. In the depicted embodiment, the detachable component 709 is attached to the vehicle 713 via at least one housing body 711. Either the housing body 711 or the detachable component 709 can have a pole socket 701 that holds the supporting poles 702, 703 into place. In this embodiment, the pole socket 701 is a part of the detachable component 709. The fasteners 707, 708 are designed to attach the supporting poles 702, 703 and the LED banner 705.

The utilization of a large banner 705 equipped with an LED screen 605 emerges as a cutting-edge method for conveying crucial messages to other vehicles and passersby. This system may serve as a highly visible alert and allow for the display of important messages and instructions in multiple directions. The LED screen's 605 adaptability enables real-time communication, whether it's notifying surrounding traffic about road closures, providing emergency contact information, or instructing pedestrians to a wider area. This system may also enhance a vehicle's 713 communication capabilities, ensuring that critical information can be relayed swiftly and effectively during emergency situations. The combination of a large LED banner 705 and a first responder vehicle 713 can deliver a powerful and versatile tool for maintaining public safety.

Figure 8A:
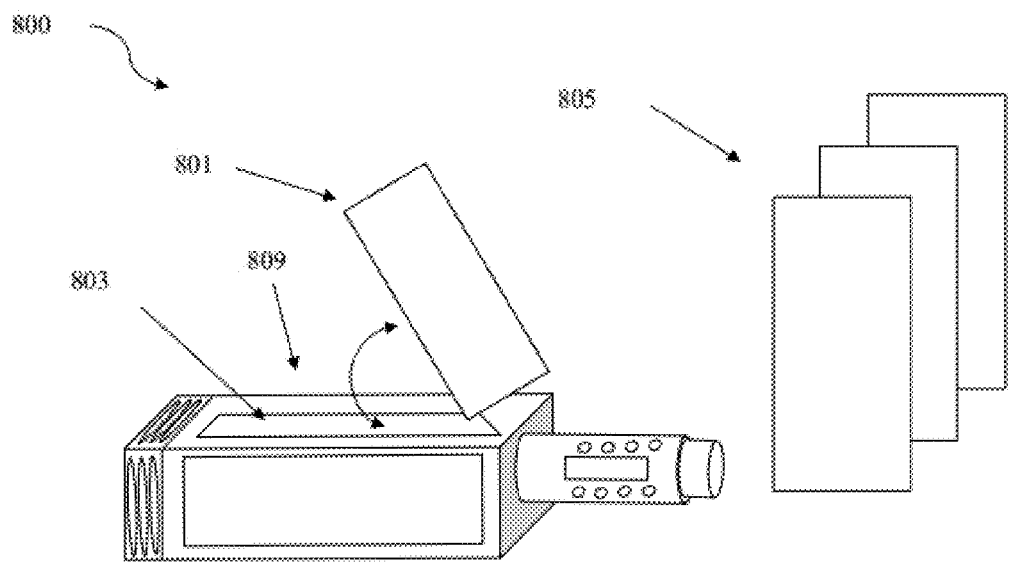
FIGS. 8A-8B are illustrations of a vehicle attachment stacked with at least one extra LED screen according to an embodiment of the present disclosure.
Figure 8B:
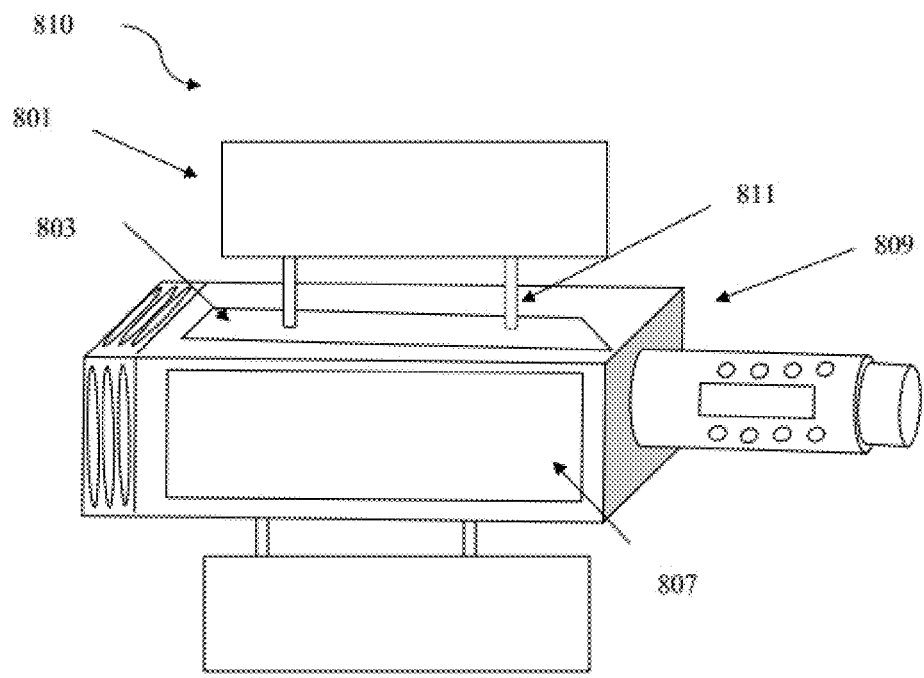

Referring to FIGS. 8A-8B show the detachable component 800, 810 stacked with at least one extra LED screen 801 according to an embodiment of the present disclosure. The detachable component 800, 810 may be configured to contain at least one extra screen that is inside of the elongated body. In FIG. 8A, an extra screen 801 is being extended from an extra screen base 803. The extended extra screen 801 can rotate and can stop at any point along a rotation the depending on a user's preference. Additional extra screens 805 can be placed within the elongated body 809 of the detachable component 800 to be utilized. The additional extra screens 801, 805 can act as an extension of a screen on the elongated body 809, or the other extra screens 805 can act as an independent screen displaying a message with little to no relation when compared to the extra screen 801 on the elongated body 809.

In FIG. 8B, the detachable component 810 has two or more extra screens 801 extending from an extra screen base 803. In this embodiment, the extra screens 801 do not rotate; rather, the extra screens 801 extend from the elongated body via supports 811. The supports 811 allow the extra screens 801 to slide out from the elongated body 809. Again, the extra screens 801 can serve act as an extension of a screen 807 on the elongated body 809, or the extra screens 801 can act as an independent screen displaying a message with little to no relation when compared to a screen 807 on the elongated body 809.

Referring to FIGS. 9A-9B show the detachable component 900 standing upright. In one embodiment, the detachable component 900 has a set of retractable legs 901 that allow the detachable component 900 to stand upright similar to a tripod stand. The retractable legs 901 can extend from the handle 911 of the detachable component 900. In another embodiment, the retractable legs 901 can extend from the elongated body 909 as opposed to the handle 911. These retractable legs 901 may serve a dual purpose, not only providing stability for the detachable component 900 but also allowing it to mimic the appearance of a flare or a traffic cone. In times of urgency, such as roadside emergencies or accidents, these extended retractable legs 901 create a visible and recognizable marker, effectively signaling to other road users and pedestrians. This multipurpose functionality can enhance the detachable component's 900 role beyond illumination, contributing to overall safety by alerting individuals to potential hazards.

Figure 10A:
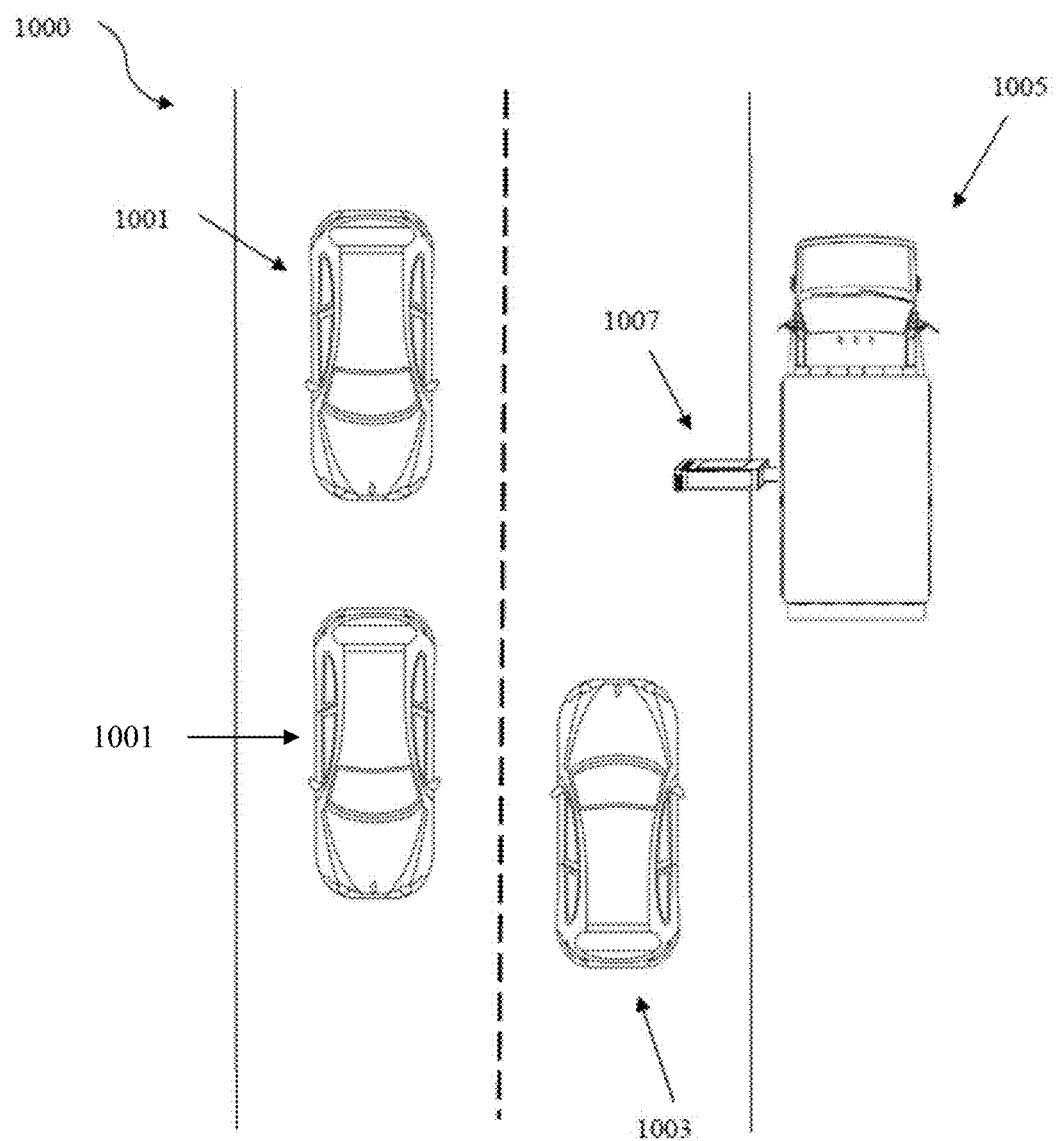
FIGS. 10A-10B are illustrations of a vehicle attachment being utilized in emergency situations according to an embodiment of the present disclosure.
Figure 10B:
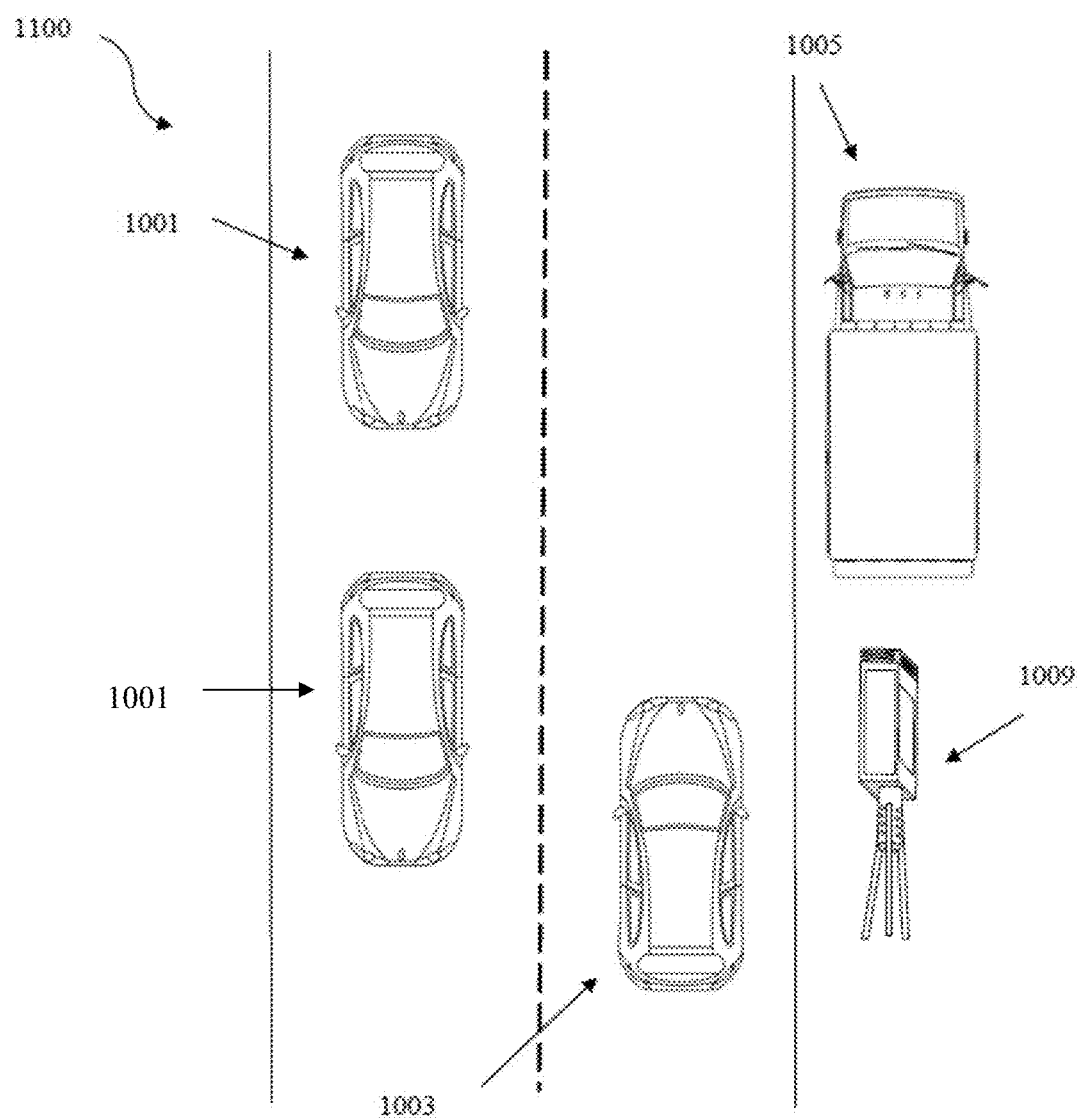

Referring to FIGS. 10A-10B show the vehicle attachment including the detachable component 1007 being utilized by first responder vehicles 1005. Emergency situations 1000, 1100 each utilize the detachable component 1007, 1009 in certain ways.

In FIG. 10A, the emergency first responder vehicle 1005 is pulled over on a shoulder of a two-way street. Oncoming vehicles 1001 and 1003 are attempting to pass the emergency first vehicle 1005. In this situation, vehicle attachment including the detachable component 1007 is attached to the vehicle 1005 and being used in an extended position. This position is useful to notify other vehicles 1001, 1003/passersby of the situation as well as create space for first responders to handle a situation. The extended detachable component 1007 creates room and will force other vehicles 1001, 1003 to proceed with caution to move around the extended detachable component 1007.

In FIG. 10B, the emergency first responder vehicle 1005, is pulled over on a shoulder of a two-way street. Oncoming vehicles 1001 and 1003 are attempting to pass the emergency first vehicle 1005. In contrast to the detachable component 1007 being in an extended position, in this situation 1100, the first responders are utilizing the detachable aspect of the detachable component 1009. The detachable component 1009 has been removed from the housing body (not shown) on the side of the vehicle 1005. This device 1009 is then stood upright via the retractable legs 901 of the detachable component 1009.

Although this invention has been described with respect to certain specific exemplary embodiments, many additional modifications and variations will be apparent to those skilled in the art in light of this disclosure. It is, therefore, to be understood that this invention may be practiced otherwise than as specifically described. Thus, the exemplary embodiments of the invention should be considered in all respects to be illustrative and not restrictive, and the scope of the invention to be determined by any claims supportable by this application and the equivalents thereof, rather than by the foregoing description.

What is claimed is:

1. A vehicle attachment comprising:
a housing body comprising a pivot;
a detachable component comprising an elongated body having a multiplicity of sides, wherein a head portion is located on a distal end of the elongated body and a handle is located at a proximal end of the elongated body;
a coupling assembly configured to allow the detachable component to be removed; and
a charging assembly comprising a battery and an output, wherein the charging assembly is configured to charge the detachable component,
wherein the elongated body comprises an LED assembly coupled to each side of the elongated body, the LED assembly including one or more LED screens.

2. The vehicle attachment of claim 1, further comprising a solar panel on the housing body.

3. The vehicle attachment of claim 1, wherein the elongated body comprises at least one communication sensor configured to detect audio information, visual information, and/or location information.

4. The vehicle attachment of claim 1, wherein the head portion comprises a flashlight having a hardened lens, wherein the hardened lens is capable of withstanding a blunt force.

5. The vehicle attachment of claim 1, wherein the handle comprises a pressure pad configured to detect an identity of a user and/or detect a specific movement sequence when operating the vehicle attachment.

6. The vehicle attachment of claim 1, wherein the housing body further comprises an interior circuitry configured to obtain signals in communication with an external source.

7. The vehicle attachment of claim 1, wherein the handle comprises a set of retractable legs capable of serving as a tripod stand.

8. The vehicle attachment of claim 1, wherein the elongated body further comprises at least one screen contained within the elongated body that is configured to extend from the elongated body.

9. The vehicle attachment of claim 1, wherein the handle comprises a pommel.

10. A vehicle comprising the vehicle attachment of claim 1.

11. A method for operating the vehicle attachment of claim 1, the method comprising the steps of:
powering on the detachable component; and
displaying a message on at least one of the multiplicity of sides.

12. The method of claim 11, further comprising the step of:
detaching the detachable component from the housing body.

13. The method of claim 12, further comprising the steps of:
extending a set of retractable legs from the detachable component; and
positioning the detachable component to an upright position using the set of retractable legs.

14. The method of claim 11, further comprising the steps of:
applying pressure to a pressure pad on the handle; and
activating a predetermined activation sequence.

15. The method of claim 11, further comprising the step of:
extending at least one screen contained within the elongated body to an extended outright position.

16. A vehicle attachment comprising:
a housing body comprising a pivot;
a detachable component comprising an elongated body having a multiplicity of sides, wherein a head portion is located on a distal end of the elongated body and a handle is located at a proximal end of the elongated body;
a coupling assembly configured to allow the detachable component to be removed; and
a charging assembly comprising a battery and an output, wherein the charging assembly is configured to charge the detachable component,
wherein the handle comprises a set of retractable legs capable of serving as a tripod stand.

17. A vehicle attachment comprising:
a housing body comprising a pivot;
a detachable component comprising an elongated body having a multiplicity of sides, wherein a head portion is located on a distal end of the elongated body and a handle is located at a proximal end of the elongated body;
a coupling assembly configured to allow the detachable component to be removed; and
a charging assembly comprising a battery and an output, wherein the charging assembly is configured to charge the detachable component,
wherein the elongated body further comprises at least one screen contained within the elongated body that is configured to extend from the elongated body.

* * * * *